Dec. 27, 1960

P. N. SILLASEN ET AL 2,965,985

ROTARY WHIRLING DITCHER

Filed April 22, 1959

INVENTORS.
Peter Nielsen Sillasen
Rosanna Mae Sillasen
BY Victor J. Evans Co.

ATTORNEYS

Dec. 27, 1960

P. N. SILLASEN ET AL 2,965,985

ROTARY WHIRLING DITCHER

Filed April 22, 1959

INVENTORS.
Peter Nielsen Sillasen
Rosanna Mae Sillasen
BY Victor J. Evans & Co.

ATTORNEYS

# United States Patent Office 2,965,985
Patented Dec. 27, 1960

2,965,985

ROTARY WHIRLING DITCHER

Peter Nielsen Sillasen and Rosanna Mae Sillasen, Gooding, Idaho, assignors to John Mays, Gooding, Idaho Filed Apr. 22, 1959, Ser. No. 808,204

3 Claims. (Cl. 37—92)

This invention relates to a rotary ditcher.

The object of the invention is to provide a rotary ditcher which is adapted to be mounted behind a vehicle such as a tractor whereby the power take-off of the tractor can be used for operating the rotary ditcher so that a trench or the like can be readily provided in the ground or soil being worked.

Another object of the invention is to provide a rotary ditcher which is adapted to be pulled behind a towing vehicle such as a tractor and whereby the vehicle is adapted to operate the ditcher of the present invention, the present invention including a frame which may have its parts arranged directly in alinement with and to the rear of the towing vehicle, or else the frame may include offset portions so that the rotating blades will be offset from the center of the towing vehicle.

A further object of the invention is to provide a rotary whirling ditcher which is extremely simple and inexpensive to manufacture.

Other objects and advantages will be apparent during the course of the following description.

In the accompanying drawings, forming a part of this application, and in which like numerals are used to designate like parts throughout the same.

Figure 1:
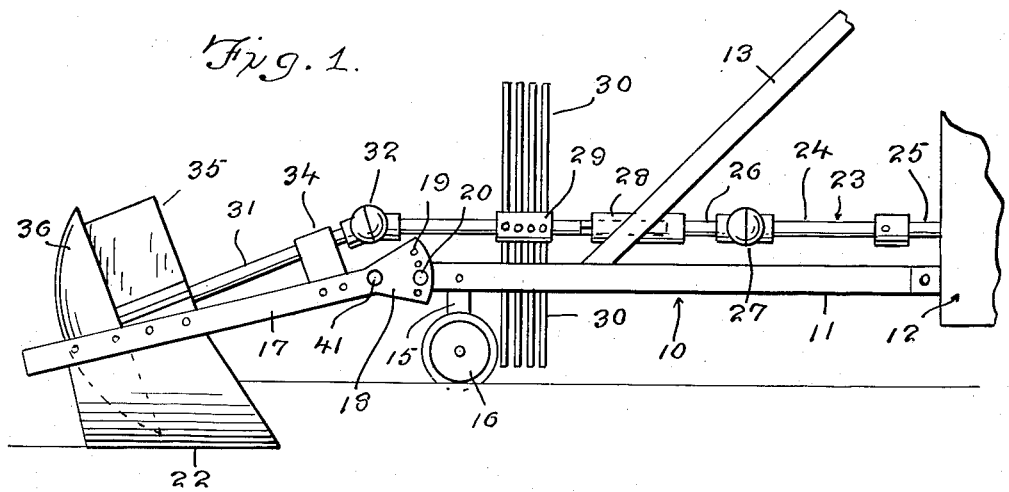
Figure 1 is a side elevational view of the rotary whirling ditcher of the present invention.
Figure 2:
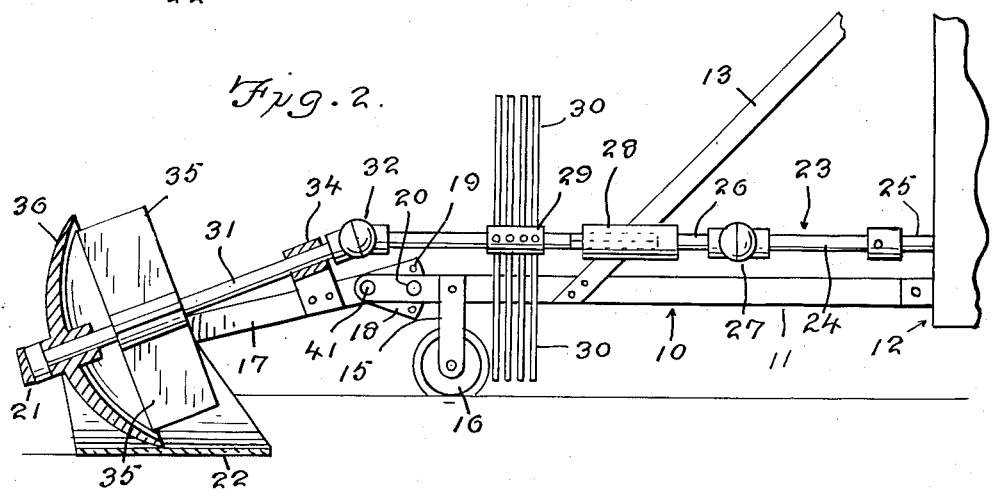
Figure 2 is a view similar to Figure 1, but with parts broken away and in section.
Figure 4:
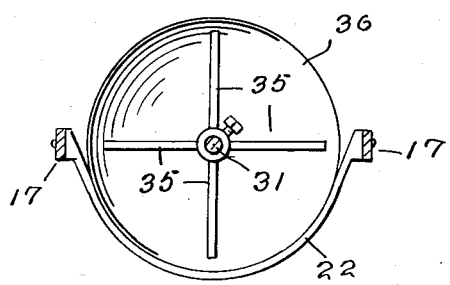
Figure 4 is a transverse sectional view illustrating certain constructional details of the present invention.

Referring in detail to the drawings, and more particularly to Figures 1–4 of the drawings, there is shown a rotary whirling ditcher which includes a frame that is indicated generally by the numeral 10, and the frame 10 includes a pair of spaced parallel beams 11 which are adapted to be connected to a towing vehicle such as the vehicle 12 which may be a tractor or the like. Inclined braces 13 are connected to the beams 11 as at 14, and the upper front portions of the braces 13 may also be connected to the towing vehicle 12.

Depending from the rear ends of the beams 11 are vertically disposed legs 15, and ground engaging wheels 16 are connected to the legs 15.

There is further provided a pair of spaced parallel arms 17 which have enlarged flanges 18 on their front ends, and the flanges 18 are provided with a plurality of spaced apart apertures 19 whereby a suitable securing element such as the pin 20 can extend through one of the apertures 19 and through an aperture or opening in the rear end of the corresponding beam 11. The provision of the plurality of apertures 19 permits the arms 17 to be moved to different adjusted positions with respect to the beams 11.

Figure 3:
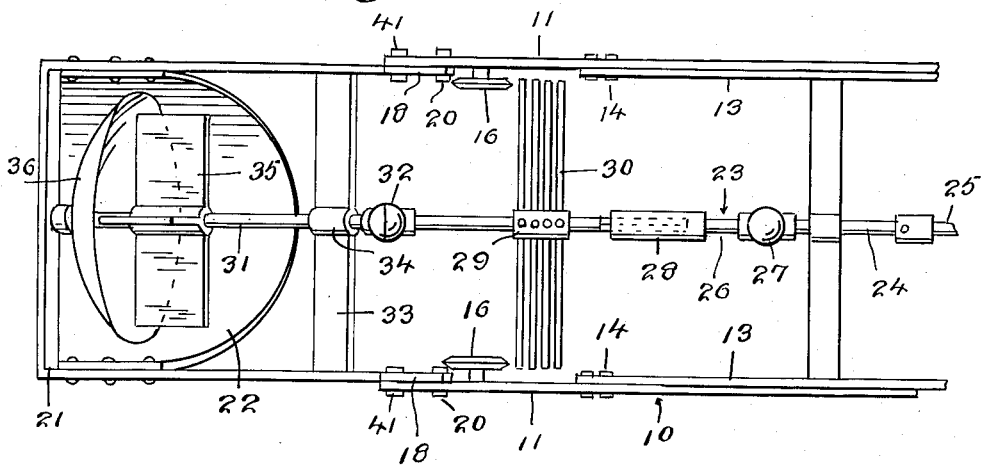
Figure 3 is a plan view of the assembly of Figures 1 and 2.

The numeral 21 indicates a crosspiece which extends between the rear ends of the arms 17 and which is secured thereto or formed integral therewith, Figure 3. A curved shield 22 is suitably fastened to the pair of arms 17.

The numeral 23 indicates a drive assembly which includes a first shaft section 24 that is adapted to be coupled to the power take-off 25 of the vehicle 12. A second shaft section 26 is coupled to the first section 24 by means of a universal joint 27, and the shaft section 26 is provided with a slip joint 28. A bushing or sleeve 29 is mounted on the shaft section 26, and a plurality of spaced apart rods or fingers 30 are suitably affixed to the sleeve 29. The numeral 31 indicates a third shaft section which is connected to the shaft section 26 by means of a universal joint 32. Mounted on the shaft section 31 is a plurality of radially disposed blades 35, and an arcuate shovel or scoop 36 is arranged rearwardly of the blades 35. The numeral 33 indicates a crossbar which extends between the arms 17 and which is secured thereto, and a bearing 34 on the crossbar 33 has the shaft section 31 extending therethrough.

Figure 5:
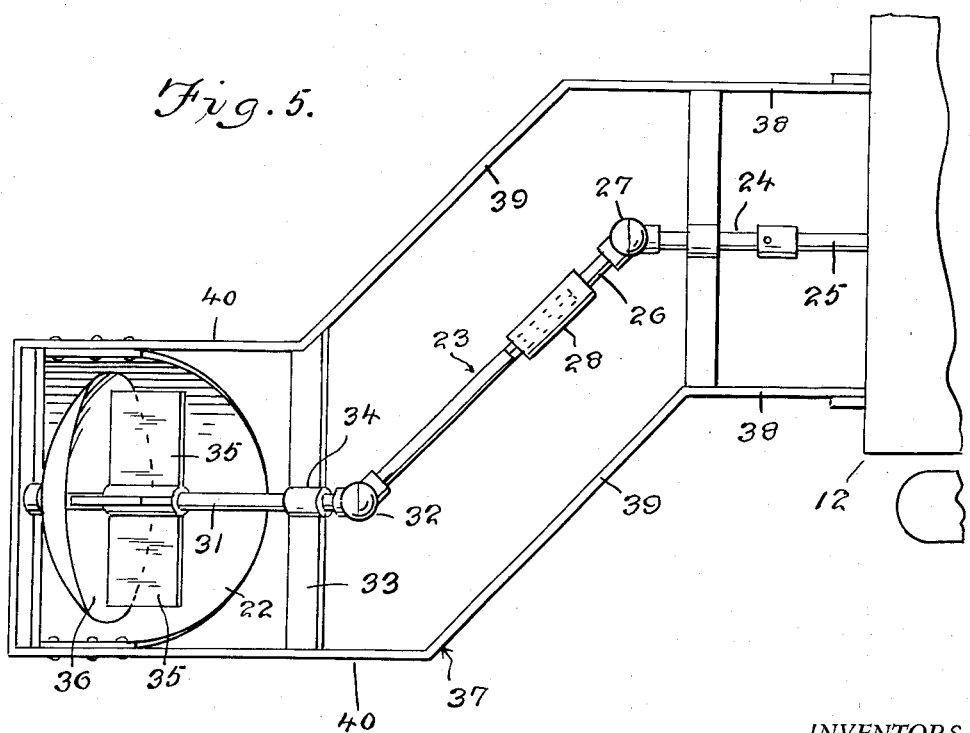
Figure 5 is a plan view similar to Figure 3, but illustrating a modification.

Referring now to Figure 5 of the drawings, there is illustrated a modified frame which is indicated generally by the numeral 37, and the frame 37 includes first portions 38 which are arranged in alinement with the vehicle 12, and the frame 37 further includes second portions 39 which are arranged angularly with respect to the first portions 38. The frame 37 also includes third portions 40 which are arranged angularly with respect to the portions 39, and the arrangement shown in Figure 5 provides that the blades 35 will be arranged off-center with respect to the vehicle 12, as for example when a trench is to be dug out of alinement with respect to the towing vehicle.

From the foregoing, it is apparent that there has been provided a rotary whirling ditcher, and in use with the ditcher of the present invention mounted behind a vehicle such as the vehicle 12, it will be seen that the wheels 16 will engage the ground and help support the assembly 10. The beams 11 are connected to the arms 17 by means of pins 20 and 41, and this arrangement permits the beams and arms to be arranged at different angular positions with respect to each other. It will be seen that as the vehicle 12 moves along the ground or other area being worked, and with the power take-off 25 operating, the shaft assembly 23 will be driven. Thus, the shaft section 24 will rotate the shaft section 26 through the medium of the universal joint 27, and this will cause rotation of the rods 30 which can be used for clearing away weeds, brush or the like, and due to the provision of the universal joint 32, the shaft section 21 will be rotated which in turn will cause rotation of the blades 25. The lower front portion of the scoop 22 will dig up the ground and the rotating blades 35 will cause the dirt to be thrown outwardly in conjunction with the shield 36 so that a trench will be formed as the machine moves along the ground.

In the arrangement shown in Figures 1–4, a trench which will be formed which will be disposed in alinement with the central rear portion of the vehicle 12. In certain instances, as for example as shown in Figure 5, a trench may be desired which is not in alinement with the longitudinal axis of the vehicle 12, and in Figure 5 due to the provision of the frame 37 which includes the intermediate offset portions 39, it will be seen that the blades 35 and their associated parts will form a trench which is disposed in an offset position with respect to the longitudinal axis of the vehicle 12.

The parts can be made of any suitable material and in different shapes or sizes.

Thus, according to the present invention it will be seen that there has been provided a device which is especially suitable for use in forming a ditch, trench or the like, and wherein such a ditch or trench can be used for any desired purpose.

The member 22 functions as a cutter, and the blades 35 will serve to throw the dirt outwardly which has been cut by the member 22. Suitable braces can be used wherever desired or required. The members 36 helps trim the ditch or trench to the desired size. The rods 30 can be used to knock down weeds, or debris or the like. The rods 30 can function as a weed fork to take care of the larger bunches of debris which may be in the bottom of the ditch. The device may be made in different sizes, and for example it may be used behind a caterpillar tractor, and a straight frame can be used for large ditches, or an offset frame as shown in Figure 5 can be used to provide a ditch behind the right or left rear wheel of the tractor. The present invention is especially suitable for seed ditches.

Minor changes in shape, size and rearrangement of details coming within the field of invention claimed may be resorted to an actual practice, if desired.

We claim:

1. In a rotary whirling ditcher, a frame including a pair of spaced parallel beams, inclined braces having their lower ends connected to said beams, legs depending from said beams, wheels connected to said legs, arms having apertured flanges adjustably connected to said beams, a crosspiece extending between the ends of said arms, a curved shield connected to said arms, a drive assembly including a first shaft section, a second shaft section coupled to said first shaft section through the medium of a universal joint, a slip joint on said second shaft section, a sleeve on said second shaft section, a plurality of spaced apart rods affixed to said sleeve, a third shaft section coupled to said second shaft section through the medium of a universal joint, a crossbar extending between said arms and having a bearing thereon for the projection therethrough of said third shaft section, rotary blades on said third shaft section, and an arcuate shield disposed rearwardly of said blades and operably connected to said third shaft section.

2. The structure as defined in claim 1, wherein said first shaft section is adapted to be connected to a power takeoff.

3. The structure as defined in claim 1, wherein the longitudinal axis of said arms is parallel to the longitudinal axis of the beams.

References Cited in the file of this patent

UNITED STATES PATENTS

| 2,542,474 | Burchett | Feb. 20, 1951 |

FOREIGN PATENTS

| 8,631 | Denmark | July 9, 1906 |
| 742,316 | Great Britain | Dec. 21, 1955 |